United States Patent [19]
Johnston et al.

[11] Patent Number: 5,896,964
[45] Date of Patent: Apr. 27, 1999

[54] SPLIT ROTOR COOLING FAN CLUTCH

[75] Inventors: Gary Lee Johnston, Pleasant Hill; William Charles Kruckemeyer, Beavercreek; Michael Leslie Oliver, Xenia, all of Ohio; Swaminathan Gopalswamy, Rochester Hills, Mich.; Samuel Miller Linzell, Troy, Mich.; Gary Lee Jones, Farmington Hills, Mich.

[73] Assignee: General Motors Corporation, Detroit, Mich.

[21] Appl. No.: 08/867,623

[22] Filed: Jun. 2, 1997

[51] Int. Cl.$^6$ ............................................. F16D 35/00
[52] U.S. Cl. ..................................... 192/21.5; 192/58.4
[58] Field of Search ................................. 192/21.5, 58.4, 192/58.5, 58.6; 188/267.2

[56] References Cited

U.S. PATENT DOCUMENTS

| | | | |
|---|---|---|---|
| 2,629,472 | 2/1953 | Sterner | 192/58.6 X |
| 2,736,409 | 2/1956 | Logan | 192/21.5 |
| 2,804,955 | 9/1957 | Gill | 192/21.5 |
| 3,250,341 | 5/1966 | Takahashi | 192/21.5 X |
| 3,587,800 | 6/1971 | Crawford | 192/58.4 |
| 3,696,899 | 10/1972 | Kongelka | 192/58.4 |
| 4,227,861 | 10/1980 | LaFlame | 416/169 A |
| 4,285,421 | 8/1981 | Halsted | 192/84 C |
| 4,302,156 | 11/1981 | LaLame | 416/169 A |
| 4,310,085 | 1/1982 | LaFlame | 192/58 B |
| 4,665,694 | 5/1987 | Brunken | 192/58.5 X |
| 4,920,929 | 5/1990 | Bishop | 123/41.49 |
| 4,957,644 | 9/1990 | Price et al. | 252/62.52 |
| 4,967,887 | 11/1990 | Annacchino et al. | 192/21.5 |
| 5,137,128 | 8/1992 | Takei et al. | 192/21.5 |
| 5,713,444 | 2/1998 | Schroeder | 192/21.5 |

OTHER PUBLICATIONS

U.S. Ser. No. 08/867,640 "Magnetorheological Fluid Fan Clutch;" filed Jun. 2, 1997.

U.S. Ser. No. 08/869,299 "Passive Magnetorheological Clutch;" filed Jun. 4, 1997.

U.S. Ser. No. 08/867,638 "Magnetorheological Clutch with Minimized Reluctance;" filed Jun. 2, 1997.

U.S. Ser. No. 08/862,914 "Magnetrheological Transmission Clutch;" filed May 23, 1997 (issuing as U.S. Pat. No. 5,823,309 on Oct. 20, 1998).

Rabinow, J.—The Magnetic Fluid Clutch, AIEE Transactions, vol. 67, 1948.

Rabinow, J.—Magnetic–Fluid Control Devices, presented at the SAE National Transportaion Meeting, Cleveland, 1949.

Ramakrishnan, S. et al—Theory and performance of the disc–type electromagnetic particle clutch under continuous slip service, IEE Proc., 1980.

Grau R. et al—The Magnetic Particle Clutch (A Versatile Control Element for Rocket Systems), Aerospace Engineering 1961.

Varadakumari, G. et al—Viscous torque of disc–type magnetic fluid slip clutches, IEE Proc., 1984.

Magnetic Particle Clutch, Automobile Engineer, May 1954 pp. 181–186.

Primary Examiner—Rodney H. Bonck
Attorney, Agent, or Firm—Jeffrey A. Sedlar

[57] ABSTRACT

A split rotor cooling fan clutch includes an input member that is constantly driven at engine speed, or at some selected proportion thereof. An output member is journaled on the input member so as to be supported thereon in a substantially nonrotating state when decoupled and alternately, to be concentrically rotatable in concert therewith at a variety of speeds. A space presented between the input and output members contains a quantity of magnetorheological fluid. An engagement mechanism includes the split rotor and coil, with a ferromagnetic element positioned to define an operative gap between the rotor and the ferromagnetic element. The coil is selectively energized with a given current to result in a torque transfer between the input and output elements that provides a rotational speed of the fan tailored to the cooling requirements of the associated engine. Internal heat generation is managed electronically to prevent overheating.

13 Claims, 4 Drawing Sheets

SPLIT ROTOR COOLING FAN CLUTCH

TECHNICAL FIELD

The present invention relates to a split rotor cooling fan clutch. More particularly, the invention relates to an engine driven cooling fan clutch utilizing a magnetorheological suspension fluid for variably transmitting force from a normally rotating split rotor to a de-coupleable output element and connected fan.

BACKGROUND OF THE INVENTION

Motor vehicles with internal combustion engines conventionally employ a fan to move cooling air through a radiator to reduce the temperature of coolant fluid circulated therein. For improved efficiency, a clutch is generally included that engages when the engine coolant is above a certain preselected temperature, and disengages when the coolant is below that temperature. Often, the clutch utilizes the viscous properties of a contained fluid to provide increased angular fan acceleration. A typical viscous clutch design utilizes fluid that is carried in a reservoir and is introduced to a working chamber, engaging the clutch and rotating the attached fan. The clutch drives the fan at approximately the input speed when additional cooling is required and allows the fan to rotate at a low disengaged speed when additional cooling is not required. The clutch is generally engaged by a thermostat that responds to air flowing through the radiator that is at a temperature representative of the engine's coolant temperature. The viscous clutch can generally only be engaged or disengaged, and it is engaged at or near engine speed, even when the cooling requirements could be supplied at a lower speed.

Coupling devices, including clutches for use in environments such as cooling systems, that operate with electromagnetomechanical engagement mechanisms are known wherein rotation of an output member relative to a driven input member is controlled by means of magnetic flux. The magnetic flux lines pass through the input and output members and through air or fluid gaps to transfer torque. Fluids have been developed that free the input and output members from one another permitting relative and independent rotation therebetween when the magnetic field was absent. When the necessary electromagnetic coil is energized, the magnetic fluid locks the input and output members together for unitary rotation. Generally, this means that the fan is nearly instantaneously accelerated to engine speed, which results in the impartation of high stresses and tends to generate undesirable noise levels. Additionally, the electrical current is generally applied to the coil at a single engagement effective rate, whenever it is desirable to drive the fan.

Fluids for use in electro-magnetomechanical force transmission devices are known wherein material such as finely powdered iron or iron alloy particles are carried in a liquid such as mineral oil or silicone. The suspension of ferromagnetic particles in a fluid medium is known to affect the rheology of the fluid, particularly when subjected to magnetic flux. More specifically, flow characteristics can change by several orders of magnitude within milliseconds when subjected to a suitable magnetic field. The ferromagnetic particles remain suspended under the influence of magnetic fields and applied forces. Such magnetorheological fluids have been found to have desirable electro-magnetomechanical interactive properties for advantageous use in variable power transmission devices such as clutches, where magnetic fields provide the essential coupling in the energy transfer process. For example, magnetorheological fluids exhibit a self reversing increase in viscosity when subjected to an increase in an externally supplied magnetic field. The common magnetic field is distributed throughout a region of space, generally in a variable manner depending on distance from the field's source with the flux density being high close to the surface of the source. The fluid's rheology varies depending on the magnetic flux density and the location in the magnetic field.

Actual application of magnetorheological fluid technology in uses such as vehicle cooling fan clutches has been slow to develop. A practical and competitive design has been elusive and therefore, a need continues to exist.

SUMMARY OF THE INVENTION

According to an aspect of the present invention, a split rotor cooling fan clutch is provided that includes a rotor and flux ring arranged for minimizing the loads necessary for effecting both coupled and de-coupled rotation, while maintaining a readily manufactured design. In general, the rotor is continuously driven with the input shaft and includes two halves with the coil carried in-between. The output member is selectively engaged with the input rotor through the application of a variable magnetic field to an interposed magnetorheological fluid. The fan's rotational speed is set by allowing a controlled amount of slip in the clutch, resulting in the ability to tailor the speed to the amount of cooling. An aim of this invention is to provide a practical and competitive design.

More specifically, a split rotor cooling fan clutch in accordance with the present invention preferably includes an input member that is constantly driven at engine speed, or at some selected proportion thereof. An output member is journaled on the input member so as to be supported thereon in a substantially nonrotating state when decoupled and alternately, to be concentrically rotatable in concert therewith, and at a variety of speeds. A space presented between the input and output members contains a quantity of magnetorheological fluid. An engagement mechanism includes the split rotor and coil, with a ferromagnetic element positioned to define a region hereinafter referred to as the "operative gap" between the rotor and the ferromagnetic element. The coil is selectively energized with a given current to result in a torque transfer between the input and output elements that provides a rotational speed of the fan tailored to the cooling requirements of the associated engine.

When an electronic control unit (ECU), effects the supply of an increased current to the coil, the magnitude of magnetic flux across the operative gap increases in density between the rotor and the ferromagnetic element. The resultant torque transfer from the input member to the output member is effected across the operative gap and through the magnetorheological fluid. As the amount of current is increased, the torque transfer increases in a gradual and progressive manner.

According to a preferred embodiment of the present invention described in greater detail herein, the coil is carried by the rotor, between two split substantially mirror-imaged halves. The rotor is fixed to rotate in concert with an input shaft. The ferromagnetic element is configured as a ring positioned concentrically with the rotor, radially outside thereof, and is fixed in the output member. The coil communicates with the ECU through a coaxial pin that also rotates with the input shaft. To maintain electrical communication for signal transmission to the rotating coil, a connector includes a tubular shaft that is supported in a bearing of the output element, and is accompanied by a pair of encapsulated contacts that are engaged with the individual conductors of the coaxial pin.

According to a preferred aspect of the present invention, the output torque of the clutch is set to deliver the desired fan speed by controlling the amount of slip torque within the clutch. For every application of the split rotor cooling fan clutch, the operating fan torque is unique. With each design, the total torque, output torque and slip torque are determined. From the slip torque, the amount of slip heat generated is determined. In operation of the clutch, through the use of an algorithm, the fan speed is increased only up to a point that has been determined to generate the maximum desirable amount of slip torque heat. Advantageously, this limits the slip torque heat generated internally within the clutch. When the cooling requirements of the engine require additional fan speed, the input current signal is increased to a maximum value that effects a lock between the input and output elements so that they rotate in concert as a unit. This eliminates the generation of slip torque heat. The split rotor cooling fan clutch is designed so that maximum cooling conditions occur only under extreme conditions of engine speed and vehicle loading. When the maximum cooling condition has passed, the input current is reduced allowing the clutch to modulate fan speed according to engine cooling requirements.

According to another preferred aspect of the present invention, no seals need be employed for the sole purpose of containing the supply of magnetorheological fluid. An amount of fluid is carried in the clutch for sufficiently filling the operative gap under the influence of centrifugal force during rotation. When the clutch is static, the fluid settles under the influence of gravity and is collected in internal voids below the level of the bearings. The rotor is shaped to ensure that sufficient open volumetric capacity exists for this purpose. The clutch includes an internal cavity that is defined by a series of wall-like structures advantageously including sloped surfaces for directing the settling fluid away from the bearings. The bearings are sealed self contained units that inhibit the outward migration of any fluid that does reach them.

DETAILED DESCRIPTION OF THE PRESENTLY PREFERRED EMBODIMENT

Figure 1:
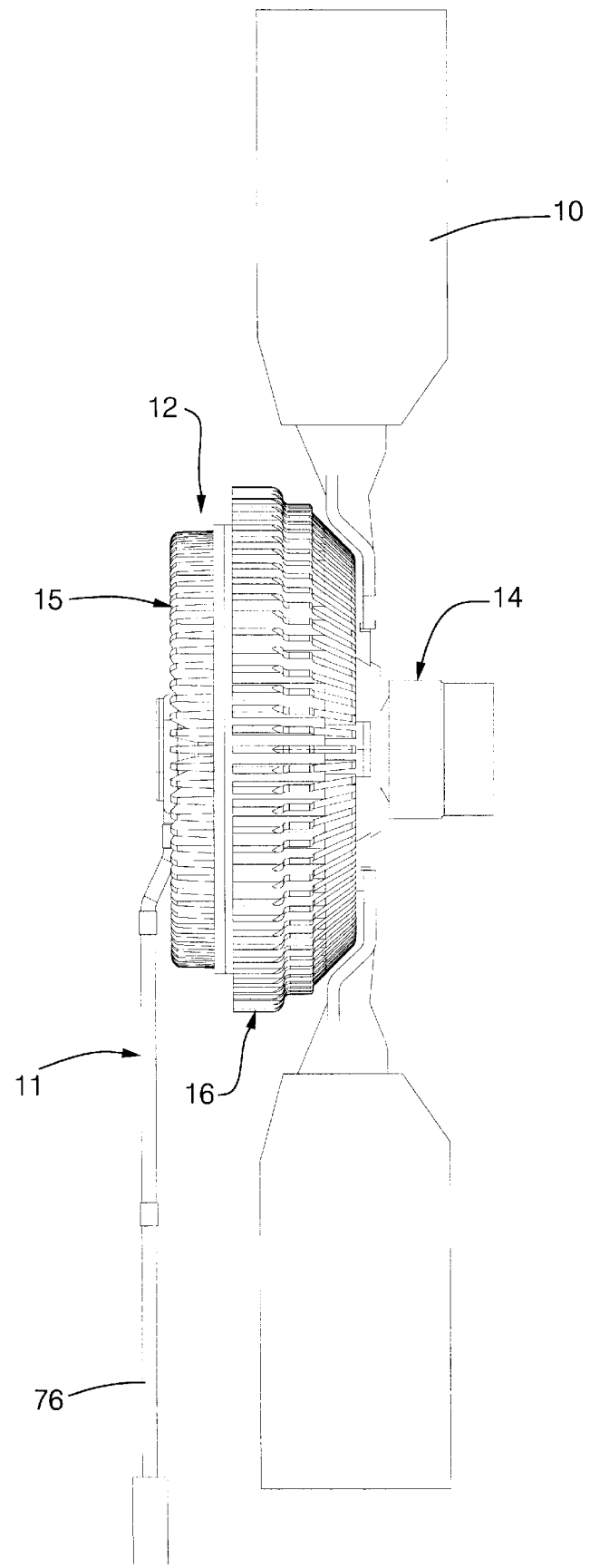
FIG. 1 is an illustration of a split rotor cooling fan clutch according to the prevent invention, assembled with a mating cooling fan and connector.

Referring to the drawings, FIG. 1 shows a split rotor cooling fan clutch illustrated as the exemplary embodiment and is designated generally as 12. Clutch 12 is shown connected in a cooling fan assembly with a fan assembly 10 and a connector assembly 11. Clutch 12 includes an input element 14, and an output element 15 that supports the fan assembly 10. The output element 15 is substantially covered with a plurality of cooling fins 16, that are axially arranged so that heat is efficiently transferred to the air flowing past the clutch 12. The connector assembly 11 is engaged with the clutch 12 and includes a rigid arm that extends radially outside the reach of the fan 10 for connection to the associated vehicle's wiring harness (not illustrated).

Figure 2:
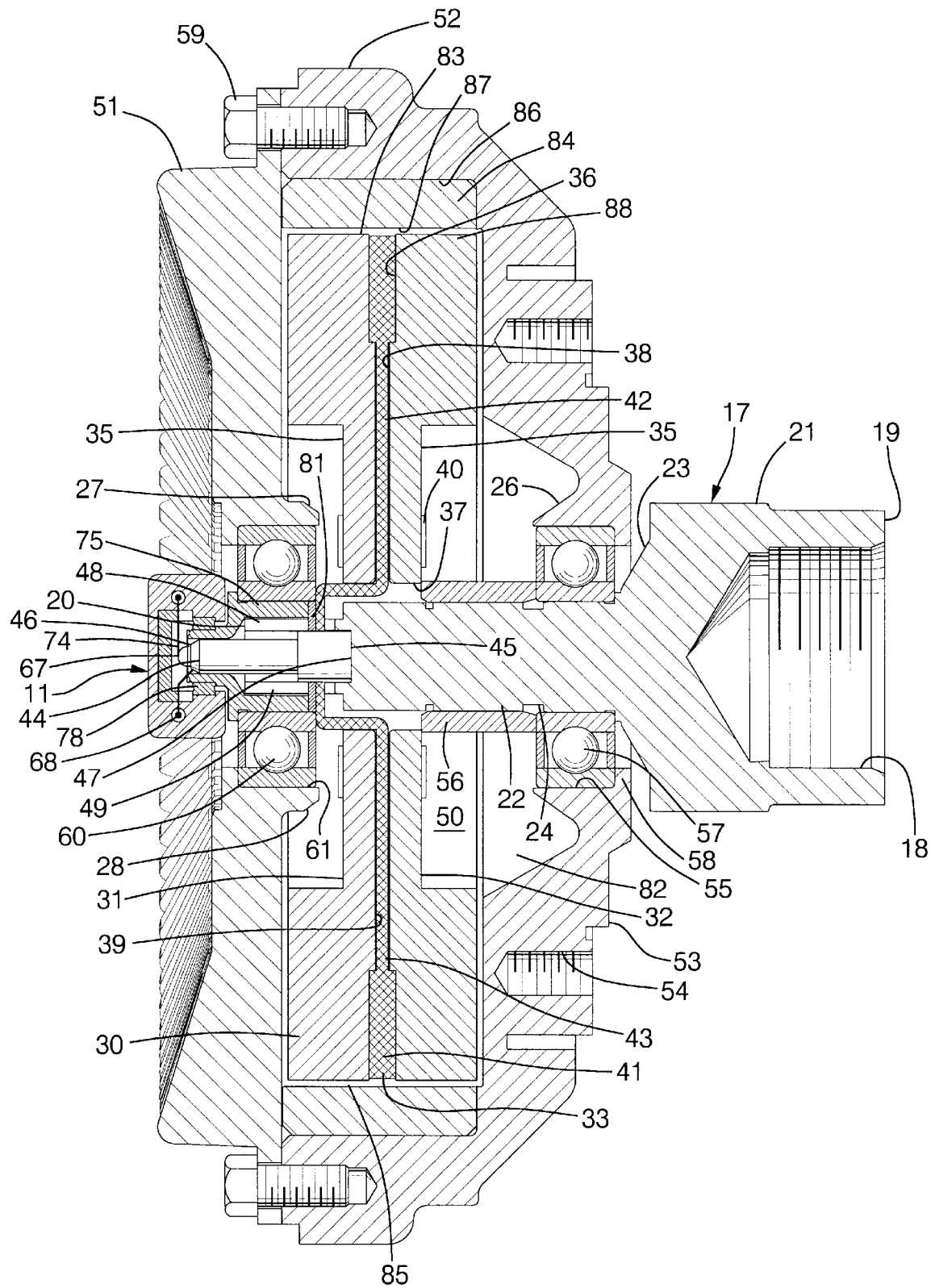
FIG. 2 is a cross sectional representation of the split rotor cooling fan clutch of FIG. 1.

Referring to FIG. 2, the operative elements of the clutch 12 are more explicitly shown. The input element 14 includes an input shaft 17 that is provided with a common means of attachment through threaded opening 18. The input shaft 17 is adapted to be connected to a vehicle's internal combustion engine (not illustrated) through the opening 18 in a well known manner, for rotation at engine speed or some selected proportion thereof through the use of a drive pulley. In particular, input shaft 17 comprises an axial shaft having a first connecting end 19 and a second terminal end 20. The threaded opening 18 is presented at the first end 19 and is formed in enlarged segment 21. Adjacent enlarged segment 21, the input shaft 17 tapers down and includes a reduced diameter segment 22 formed between annular shoulder 23 and terminal end 20. Additionally, a further reduced diameter segment 24 forms an annular keyway groove near terminal end 20.

In the input element 14, a rotor assembly 30 is formed by split substantially mirror image halves 31 and 32 with a coil assembly 33 carried therebetween. The rotor half 31 is disk shaped and includes a radially inner portion 34 of a reduced thickness. Similarly, the rotor half 32 is disk shaped and includes a radially inner portion 35 of a reduced thickness. Rotor halves 30 and 31 are relatively easily manufactured by a process such as machining steel or through powdered metallurgy. The rotor halves 31 and 32 mate together to form an annular cavity 36 and a center opening 37. A pair of radially disposed holes 38 and 39 extend between the annular cavity 36 and the center opening 37. The rotor halves are fixed together by a plurality of axially extending fasteners, representative of which is fastener 40.

A coil 41 comprising a plurality of turns of wire wound on a bobbin is carried in annular cavity 36. The coil includes a pair of leads 42 and 43, with one attached to each end of the coil's wire. The leads 42 and 43 extend through the holes 38 and 39 respectively, and attach to alternate conductors of a coaxial pin 44. The coaxial pin 44 includes an enlarged end 45 and a tapered end 46. The enlarged end 45 is seated in a circular opening 47 in the end 20 of input shaft 17. A pair of slots 48,49 extend from the end 20 of input shaft 17 and intersect the circular opening 47 so that the leads 42,43 can pass therethrough during insertion of the coaxial pin 44 into the circular opening 47. The entire coil assembly 33 including coil 41, leads 42,43 and coaxial pin 44 rotates in concert with the input shaft 17 and the rotor assembly 30 and together act as the input element 14.

The output element 15 comprises a multi-pieced shell-like structure substantially enclosing an internal cavity 50 about the majority of the input element 14. The output element 15 is in general, shaped like a substantially closed cylinder. Output element 15 includes a forward wall 51, annular side wall 52 and rearward wall 53. Forward wall 51 is fabricated as a separate unit and is secured to another unit comprising annular side wall 52 and rearward wall 53 by a plurality of fasteners, representative of which is fastener 59. The forward wall 51 and the unit comprising the annular side wall 52 and the rearward wall 53 are fabricated by a known process such as casting of aluminum. The rearward wall 53 includes a plurality of threaded openings 54 for securing the fan assembly 10 thereto. The rearward wall 53 also presents a circular opening 55 providing a surface upon which the output element 15 is journaled on the reduced diameter section 22 of input element 14.

A ball bearing assembly 57 of the sealed, self contained type commonly known in the art is positioned between the input element 14 and the output element 15 against annular shoulder 23 and flange 58 with a cylindrical spacer 56 positioned between the ball bearing assembly 57 and the rotor assembly 30. The ball bearing assembly 57 includes an inner race that is pressed onto the reduced diameter section 22 of input shaft 17 and an outer race that is contained within the circular opening 55 of the output element 15. The inner and outer races engage a plurality of balls contained within a cage and the ball bearing assembly 57 comprises a generally annular construction that is sealed and carries an internal supply of lubricant. The rearward wall 53 includes a sloped annular surface 26. Surface 26 directs any fluid away from the bearing assembly 53 that settles downwardly along the rearward wall 53 under the effect of gravity when the clutch 12 is static.

Output element 15 is additionally supported on the input shaft 17 through front wall 51 which is journaled by a bearing assembly 60 that is positioned in opening 61. The ball bearing assembly 60 is also of the sealed self contained type and includes an outer race that is contained within the opening 61 of the output element 15. The outer race, and a corresponding inner race engage a plurality of balls contained within a cage and the ball bearing assembly 60 comprises a generally annular construction. The inner race is supported on the input shaft 17 through the interposed connector assembly 11. Forward wall 51 includes an inwardly extending annular leg 27 with a sloped surface 28 that directs any fluid away from the bearing assembly 60 that settles downwardly along the forward wall 51 under the effect of gravity when the clutch 12 is static.

Figure 3:
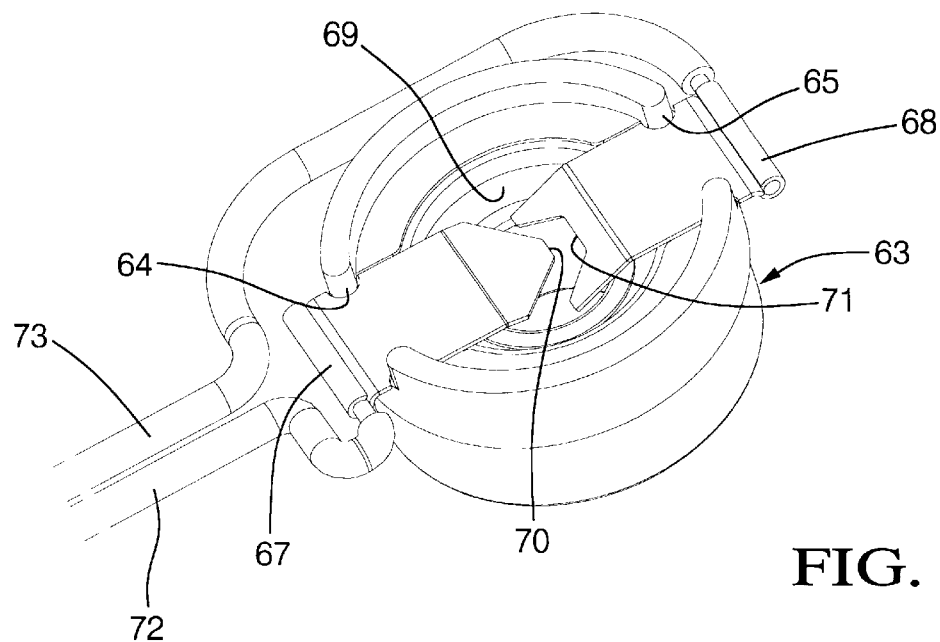
FIG. 3 is a fragmentary perspective view of the connector. shown in FIG. 1.
Figure 4:
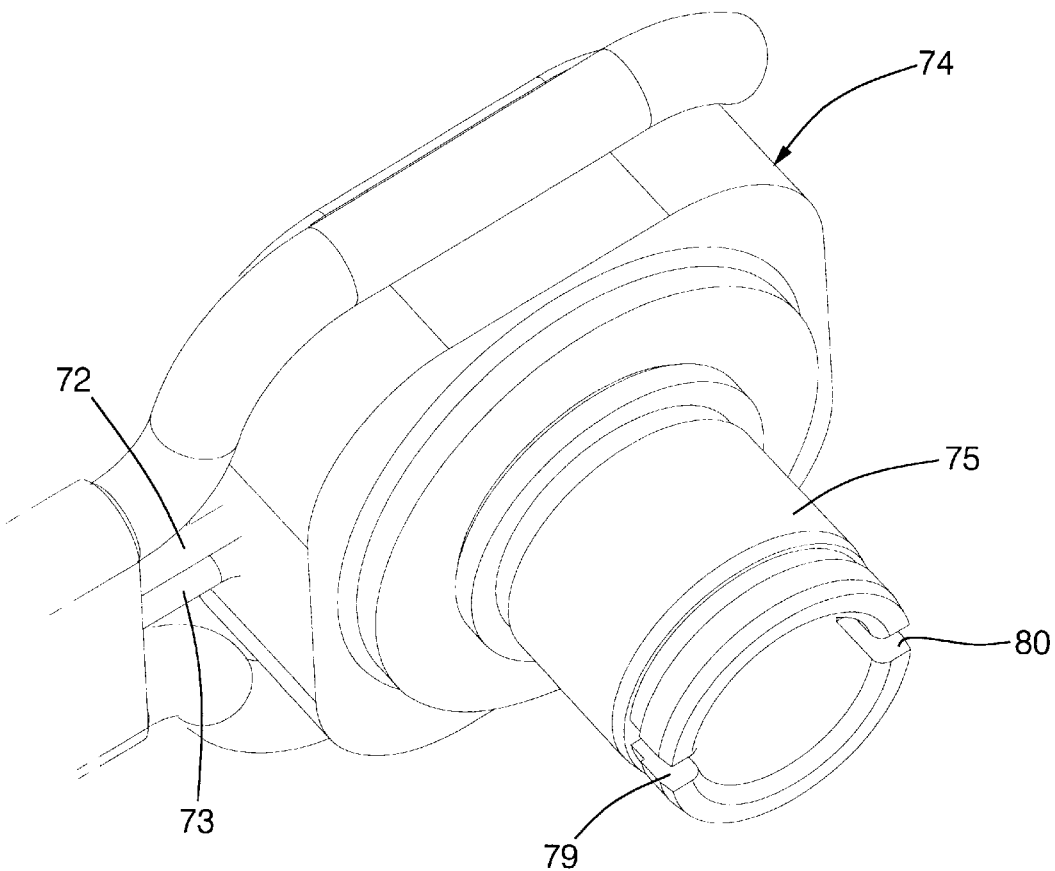
FIG. 4 is another perspective view of the connector shown in FIG. 1.

Referring to FIGS. 3 and 4, aspects of the connector assembly 11 are shown in greater detail. The subassembly of FIG. 3 reveals internal components of the connector assembly 11. A support 63 is generally annular in shape and includes a pair of slots 64 and 65 that receive a center contact 67 and an outer contact 68, respectively. The center and outer contacts 67, 68 project into an axial opening 69 of the support 63. The center contact 67 includes a tapered, inwardly bent terminal end 70 for contacting the center conductor of the coaxial pin 44. The outer contact 68 includes a forked, inwardly bent terminal end 71 for contacting the outer conductor of the coaxial pin 44. A pair of wires 72 and 73 are connected to the center and outer contacts 67, 68, respectively.

As shown in FIG. 4, the subassembly of FIG. 3 is encapsulated within a case 74 that includes a tubular extension 75. A bracket 76 includes a pair of support arms 77, 78 and engages the case 74. As shown in FIG. 1, when the connector assembly 11 is engaged with the clutch 12, the bracket 76 extends radially in front of the fan assembly 10. The support arms 77, 78 maintain the wires 72, 73 in a secure position away from the rotating components, and an electrical connector 77 is provided at a peripheral location.

Referring to FIG. 2, engagement between the connector assembly 11 and clutch 12 is more clearly shown. The coaxial pin 44 is received within the case 74 engaging the center and outer contacts 67, 68. The case 74 is nonrotatably mounted in position and includes a bearing 78 for engagement with the tubular extension 75 which is rotatably mounted. The tubular extension 75 extends between the inner race of ball bearing assembly 60 and the input shaft 17. As shown in FIG. 4, the tubular extension 74 includes a pair of slots 79 and 80 that are keyed to the input shaft 17 by a clip 81. Accordingly, the tubular extension 75 rotates in concert with the input shaft 17.

Output element 15 is carried on the input shaft 17 such that the input element 14 is rotatable while the output element 15 remains at least partially disengaged therefrom when there is some slip between the two. The output element 15 is journaled on the input shaft 17 by the ball bearing assemblies 57, 60 to generally rotate at a slower speed than the input element 14. Therefore, cooling fan 10, which is connected to the output element 15, will generally not be driven with sufficient torque to induce cooling air flow absent some means of engagement between the output element 15 and the input element 14. In order to provide this means of engagement the fan clutch 12 includes a variable engagement mechanism utilizing the magnetorheological properties of an internally carried fluid.

Magnetorheological fluids comprising a suspension of solid particles in a selected liquid are known wherein the fluid's yield stress must be exceeded in order to initiate flow. When the fluid is exposed to a magnetic field the flow threshold yield stress increases as the flux density in the field increases. Yield stress is also known to increase as the volume fraction of solid particles in the suspension is increased. Accordingly, a desired yield stress for a selected magnetorheological fluid operating in a clutch can be achieved by controlling the volume fraction of suspended particles. Magnetorheological fluids useful as in the present invention are described in detail by commonly assigned U.S. patent application Ser. No. 08/629,249 entitled "Magnetorheological Fluids," filed Apr. 8, 1996, and which is specifically incorporated herein by reference. For purposes of the present invention, the magnetorheological fluid contained in cavity 83 carries a selected volume percent of solid particles that permits substantially complete slippage between the input element 14 and the output element 15 when the clutch is disengaged. A gradually increasing torque transfer is effected between the input element 14 and output element 15 as the clutch is engaging, and provides substantially complete coupling when the clutch is fully engaged with minimal slippage between the input and output elements 14 and 25.

The cavity 83 carries a sufficient volume of magnetorheological fluid to fill the operative gap 85 under the influence of centrifugal force when the clutch 12 is rotating during periods of operation of the associated vehicle engine. The structure of the rotor assembly 30 and ring 84 minimizes the amount of magnetorheological fluid that is required. When the associated engine is off and the clutch 12 is static, the fluid settles downwardly in the cavity 83 under the influence of gravity. The amount of fluid that is in the top half of the unit passes down into the lower half 82 of the cavity 83. The void formed by the structure of clutch 12 is sufficiently large to accommodate the settling fluid within the lower half 82 below the level of the bearing assemblies 57 and 60 and below the opening 55.

The engagement mechanism of the clutch 12 principally includes an electromagnet comprising the rotor assembly 30, a ferromagnetic element in the form of flux ring 84, and the operative gap 85 that exists therebetween. The ferromagnetic flux ring 84 is formed from steel stock or powdered metal and is carried in step 86 of the annular sidewall 52 of output element 15. Flux ring 84 is exposed at surface 87 to the magnetorheological fluid carried within cavity 83. The surface 88 of rotor assembly 30 is also exposed to the magnetorheological fluid carried within the cavity 83. The magnetic field generated by the coil assembly 33 introduces a magnetic flux into the operative gap 85 that varies with the level of the current in the coil's windings such that the amount of slip between the input element 14 and the output element 15 is reduced with increasing current. When the coil assembly is deenergized, disengagement is effected such that the input element 14 rotates relatively freely while the output element 15 is substantially nondriven.

In the clutch 12, as the magnetic flux generated by the coil assembly 30 is increased in density through the operative gap 85 and the flux ring 84, the random domains in the unmagnetized ferromagnetic material of the flux ring 84 and the magnetorheological fluid align with the applied magnetic field. A result of this polarization is that the amount of slip permitted between the input element 14 and the output element 15 is reduced. Thus, as the current applied to the coil assembly 30 is increased, the speed of the output element 15 is proportionally increased toward the speed of the input element 14. Accordingly, a variable fan clutch is provided wherein the amount of torque transferred is progressively increased as needed, according to the cooling requirements of the associated vehicle's engine. Providing electronic control of a clutch in this manner using an ECU is in general, well a known to those skilled in the art.

Figure 5:
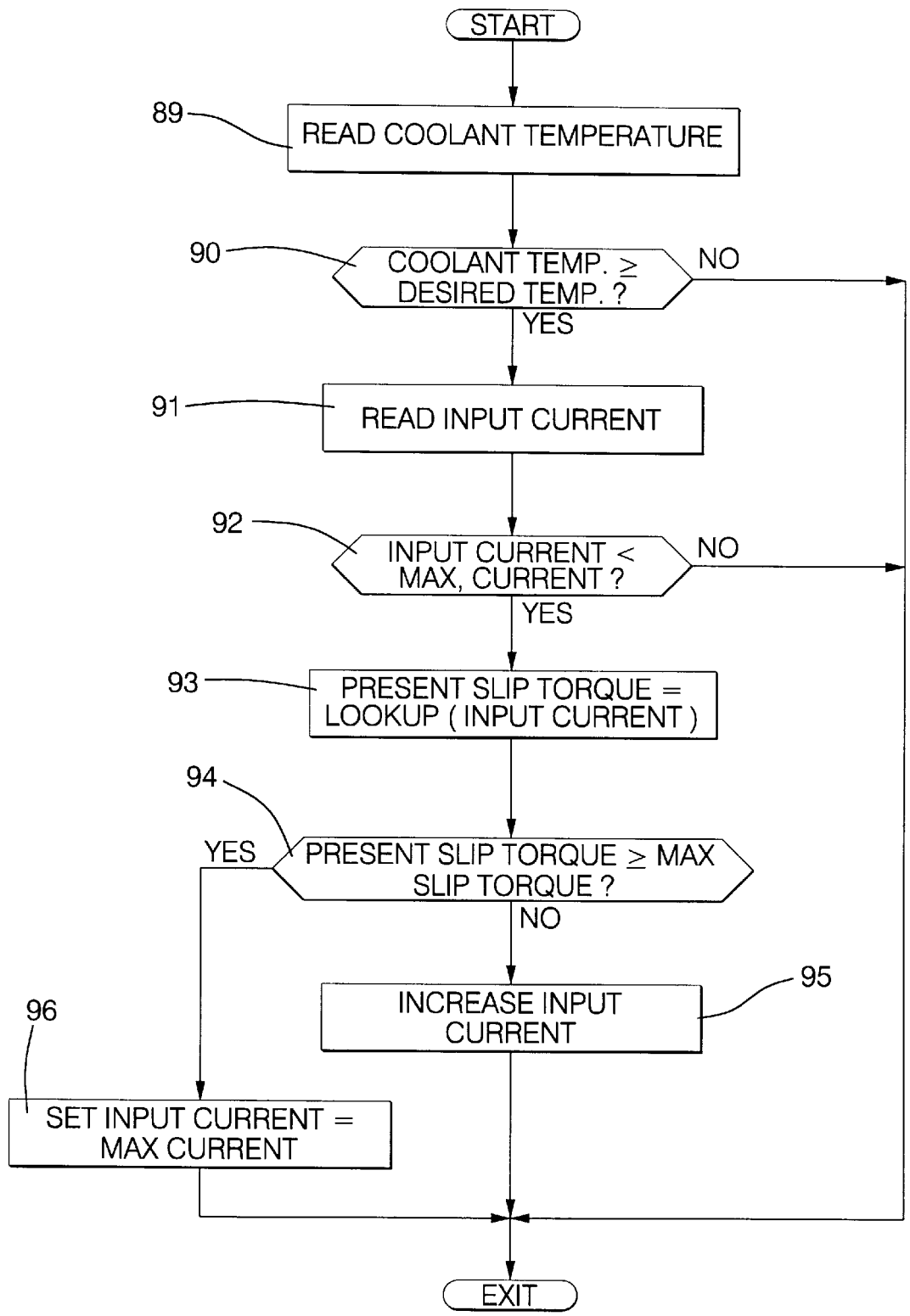
FIG. 5 is a flow diagram for an example clutch control routine according to the present invention.

Referring to FIG. 5, the general flow of an ECU routine for controlling internally generated heat of the clutch 12, when increasing current to the coil assembly 30, is illustrated. When cooling requirements increase, the ECU correspondingly increases the speed of the fan assembly 10 by increasing the level of engagement between the input element 14 and the output element 15, and the process is reversed when cooling requirements decrease. As the amount of torque transferred is increased, the amount of slip between the input element 14 and the output element 15 is decreased. The output torque of the clutch 12 is set to deliver the desired fan speed by controlling the amount of slip torque within the clutch. For every application of the split rotor cooling fan clutch, the operating fan torque is unique. With each design, the total torque, output torque and slip torque are determined. From the slip torque, the amount of slip heat generated is determined. In operation of the clutch, through the use of an algorithm such as described by FIG. 5, the fan speed is increased only up to a point that has been determined to generate the maximum desirable amount of slip torque heat. Advantageously, this limits the slip torque heat generated internally within the clutch. When the cooling requirements of the engine require additional fan speed, the input current signal is increased to a maximum value that effects a lock between the input and output elements so that they rotate in concert as a unit. This eliminates the generation of slip torque heat. The split rotor cooling fan clutch is designed so that maximum cooling conditions occur only under extreme conditions of engine speed and vehicle loading. When the maximum cooling condition has passed, the input current is reduced allowing the clutch to modulate fan speed according to engine cooling requirements.

More specifically, in the routine of FIG. 5 cooling needs are determined by reading the coolant temperature at step 89 and making a comparison to a desirable temperature at step 90. When additional cooling is not required a determination of whether to reduce the speed of the fan assembly 10 is made (not illustrated). When additional cooling is required, the routine proceeds by reading the input current level at step 91 and comparing the actual value to the desired maximum value at step 92. If input current is already at the maximum value the output element 15 is fully engaged with the input element 14 so that the two rotate in concert without slip and no further action is necessary. If input current is less than the maximum current a comparison is made between the present fan slip torque which is indicated by input current from a lookup table at step 93 and the maximum desirable slip torque at step 94. The maximum desirable slip torque is predetermined for the application. If the maximum slip torque threshold has not been reached, the input current to the coil assembly 30 is increased at step 95. If the maximum slip torque threshold has been reached, the input current is set to the maximum current at step 96, which is the current necessary to fully engage the input and output elements 14,15. Therefore, internal slip torque generated heat is substantially eliminated by substantially eliminating slip.

Through means of the present invention a practical and competitively designed magnetorheological fan clutch is provided. The rotor and flux ring are manufactured in an uncomplicated manner from steel or powdered metal and are arranged to require a minimum amount of magnetorheological fluid. Internal heat generated by the clutch is ECU managed to prevent overheating advantageously effecting durability.

What is claimed is:

1. A cooling fan clutch comprising:

an input element that is driven at a selected speed;

an output element journaled on the input element by at least one bearing assembly so as to be supported thereon in a disengaged state and to be rotatable at various speeds relative to the selected speed of the input element;

an operative gap presented between the input and output elements containing a quantity of magnetorheological fluid of a sufficient volume to fill the operative gap when the input element is driven and an engagement mechanism including a rotor assembly generating a magnetic field and a ferromagnetic element positioned near the rotor assembly across the operative gap, wherein the rotor assembly includes a split pair of substantially mirror image halves defining an annular cavity carrying a coil assembly;

wherein when an electrical current is supplied to the coil assembly, the amount of a magnetic field passing between the rotor assembly and the ferromagnetic element through the operative gap and the magnetorheological fluid carried therein increases shear stress resulting in a resultant torque transfer from the input element to the output element effected across the operative gap and through the magnetorheological fluid so that as the electric current is increased, the input and output members are engaged in a selectively increasing manner and wherein when the input element is static, the magnetorheological fluid settles downwardly to a level below the bearing assembly; and including an input shaft supporting the rotor assembly and including a terminal end carrying a coaxial pin electrically connected to the coil and a connector assembly engaging the coaxial pin and extending away from the output element, wherein the connector assembly includes a tubular extension that extends between the bearing and the input element wherein the tubular extension rotates at the speed of the input element, and a case engaging the tubular extension that is carried in a nonrotatable manner, with a pair of contacts carried in the case and engaging the coaxial pin.

2. A cooling fan clutch comprising:

an input element including an input shaft that is driven at a selected speed wherein the input shaft includes a terminal end with a circular opening and a pair of slots opening to the circular opening;

an output element journaled on the input element so as to be supported thereon in a disengaged state and to be rotatable at various speeds relative to the selected speed of the input element;

an operative gap presented between the input and output elements containing a quantity of magnetorheological fluid and an engagement mechanism including a rotor assembly carried on the input shaft and generating a magnetic field and a ring positioned near the rotor assembly across the operative gap, wherein the rotor assembly includes a split pair of substantially mirror image halves defining an annular cavity carrying a coil assembly;

a pin carried in the circular opening of the input shaft and electrically connected to the coil assembly by a pair of leads that extend through holes in the rotor wherein the coil assembly and the pin rotate in concert with the input shaft; and a connector assembly engaging the pin and extending away from the output element;

wherein when an electrical current passed to the coil assembly through the connector assembly, the leads and the pin, is increased, the amount of a magnetic field passing between the rotor assembly and the ring through the operative gap and the magnetorheological fluid carried therein increases shear stress resulting in a resultant torque transfer from the input element to the output element effected across the operative gap and through the magnetorheological fluid so that as the electric current is increased, the input and output members are engaged in a selectively increasing manner.

3. A cooling fan clutch according to claim 2, further comprising a bearing rotatably supporting the output element on the input element wherein the connector assembly includes a tubular extension that extends between the bearing and the input shaft of the input element wherein the tubular extension rotates at the speed of the input element and the connector assembly includes a case engaging the tubular extension that is carried in a nonrotatable manner with a pair of contacts carried in the case and engaging the pin.

4. A cooling fan clutch comprising:

an input element that is driven at a selected speed;

an output element journaled on the input element so as to be supported thereon in a disengaged state and to be rotatable at various speeds relative to the selected speed of the input element;

an operative gap presented between the input and output elements containing a quantity of magnetorheological fluid and an engagement mechanism including a rotor assembly generating a magnetic field and a ferromagnetic ring positioned near the rotor assembly across the operative gap, wherein the rotor assembly includes a split pair of substantially mirror image halves defining an annular cavity carrying a coil assembly; carrying a coaxial pin electrically connected to the coil assembly;

an input shaft supporting the rotor assembly and including a terminal end carrying a coaxial pin electrically connected to the coil assembly;

a connector assembly engaging the coaxial pin and extending away from the output element;

wherein when an electrical current passed to the coil assembly through the connector assembly and the coaxial pin is increased, the amount of a magnetic field passing between the rotor assembly and the ferromagnetic ring through the operative gap and the magnetorheological fluid carried therein increases shear stress resulting in a resultant torque transfer from the input element to the output element effected across the operative gap and through the magnetorheological fluid so that as the electric current is increased, the input and output members are engaged in a selectively increasing manner and, wherein the resultant torque transfer results in an amount of generated slip torque;

wherein internal heat generation is limited by comparing the generated slip torque to a maximum desirable slip torque amount and increasing current to a maximum amount that causes the input and output elements to substantially rotate in concert when the generated slip torque is greater than or equal to the maximum desirable slip torque amount.

5. A cooling fan clutch according to claim 4 further comprising a bearing rotatably supporting the output element on the input element wherein the connector assembly includes a tubular extension that extends between the bearing and the input element that rotates at the speed of the input element and a case engaging the tubular extension that is carried in a nonrotatable manner with a pair of contacts carried in the case and engaging the coaxial pin.

6. A cooling fan clutch according to claim 5 wherein the output element includes a nonmagnetic shell with a rearward wall and a forward wall supporting an annular side wall on the input shaft and wherein the annular side wall includes a step that carries the ferromagnetic ring.

7. A cooling fan clutch according to claim 6 wherein the connector assembly includes a support with a pair of slots carrying a center contact and an outer contact, both engaging the coaxial pin wherein the support is carried in the case.

8. A cooling fan clutch according to claim 7 wherein the center contact includes a tapered terminal end engaging the coaxial pin and the outer contact includes a forked terminal end engaging the coaxial pin.

9. A cooling fan clutch according to claim 8 wherein the quantity of magnetorheological fluid is of a sufficient volume to fill the operative gap under the influence of centrifugal force when the input element is driven and wherein when the input element is static, the magnetorheological fluid settles downwardly under the influence of gravity to a level completely below the bearing assembly.

10. A clutch comprising:

a driven input element including a rotor assembly that carries a magnetic field generating device;

an output element, rotatable on a bearing relative to the driven input element and positioned such that an annular space is defined between the input element and the output element wherein the annular space includes an operative gap; and a quantity of fluid responsive to the magnetic field to affect the rotation of the output element relative to the driven input element wherein the fluid is maintained at a position away from the bearing by being dispersed around the annular space when the clutch is rotating and by being carried at a level completely below the bearing when the clutch is static and wherein the rotor includes a radially inner portion of a reduced thickness to facilitate carrying of the fluid below the bearing when the clutch is static.

11. A clutch comprising:

a driven input element including a rotor assembly that carries a magnetic field generating device;

an output element, rotatable on a bearing relative to the driven input element and positioned such that an annular space is defined between the input element and the output element wherein the annular space includes an operative gap; and a quantity of fluid responsive to the magnetic field to affect the rotation of the output element relative to the driven input element wherein the fluid is maintained at a position away from the bearing by being dispersed around the annular space when the clutch is rotating and by being carried at a level completely below the bearing when the clutch is static and wherein the output element includes a sloped surface operating to direct fluid away from the bearing.

12. A clutch comprising:

a driven input element including a rotor assembly that carries an energizable coil;

an output element, rotatable on a bearing relative to the driven input element and positioned such that an internal cavity is defined between the input element and the output element wherein the internal cavity includes a perimeter and includes an operative gap defined substantially around the internal cavity's perimeter; and a quantity of magnetorheological fluid responsive to the energization of the coil to affect rotation of the output element relative to the driven input element wherein the magnetorheological fluid is maintained at a position away from the bearing substantially at all times by being dispersed around the operative gap when the clutch is rotating and by being carried at a level in the internal cavity completely below the bearing when the clutch is static and wherein the rotor includes a radially inner portion of a reduced thickness to facilitate carrying of the magnetorheological fluid below the bearing when the clutch is static.

13. A clutch comprising:

a driven input element including a rotor assembly that carries an energizable coil;

an output element rotatable on a bearing relative to the driven input element and positioned such that an internal cavity is defined between the input element and the output element wherein the internal cavity includes a perimeter and includes an operative gap defined substantially around the internal cavity's perimeter; and a quantity of magnetorheological fluid responsive to the energization of the coil to affect rotation of the output element relative to the driven input element wherein the magnetorheological fluid is maintained at a position away from the bearing substantially at all times by being dispersed around the operative gap when the clutch is rotating and by being carried at a level in the internal cavity completely below the bearing when the clutch is static and wherein the output element includes a sloped surface operating to direct fluid away from the bearing.

* * * * *